United States Patent Office 3,301,837
Patented Jan. 31, 1967

3,301,837
VULCANIZABLE COMPOSITIONS CONTAINING OLEFIN POLYMERS OR COPOLYMERS, A PROCESS FOR THEIR VULCANIZATION AND ARTICLES THUS OBTAINED
Giuliano Bartorelli and Luigi Falcone, Ferrara, and Gianfranco Pregaglia, Milan, Italy, assignors to Montecatini Edison S.p.A., Milan, Italy
No Drawing. Filed June 7, 1963, Ser. No. 286,152
Claims priority, application Italy, June 12, 1962, 11,968/62
24 Claims. (Cl. 260—88.2)

This invention relates to vulcanizable compositions containing solid polymers of alpha-olefins or amorphous elastomeric copolymers of ethylene and alpha-olefins. It, furthermore, relates to a process for vulcanizing these compositions and to the articles thereby obtained.

More particularly this invention provides for the combining of an organic peroxide capable of self-decomposition by heat to form free-radicals, and of one or more free radical acceptors consisting of organic furan derivatives, with olefin polymers or copolymers, followed by heating the mixture obtained to the vulcanization temperature.

The preparation of solid polymers of alpha-olefins and of copolymers of ethylene with alpha-olefins is well known in the art. It is also well known that the mechanical or thermal properties of these unmodified products are not satisfactory in many instances and it is therefore desirable to modify them by increasing their softening point, tensile strength and elastic properties. Various methods have heretofore been proposed for carrying out the cross-linking of these products so as to obtain polymers or elastomers having better characteristics.

It has been proposed to chemically modify the macromolecular structure of these polymers by the introduction of halogen-carboxylic groups capable of reacting with inorganic compounds or by the introduction of bifunctional organic compounds thereby causing the formation of cross-linkages, or by grafting onto the saturated macromolecules organic unsaturated compounds capable of undergoing radical polymerization. These methods however are complex, require many processing stages and are not economical.

It has been proposed to treat saturated polymers and copolymers with radical initiators selected from organic percompounds such as hydroperoxides, peroxides, peracids, peresters, etc. This latter method which is more simple than the prior methods, cannot generally be used since it often leads to the degradation of the polymers or to undesired side reactions.

According to the present novel invention it is proposed to add substances called free-radical acceptors to said percompounds in the mixes. These substances do not themselves produce free radicals in the chain but can react with radicals induced by the organic peroxide and thereby form other radicals which are more stable.

The probability of coupling of two radicals, corresponding to the formation of a cross-linking bridge, is therefore increased, resulting in a higher utilization of the peroxide for the cross-linking reaction. It is also contemplated to add small amounts of sulfur, quinone-imino compounds, maleimides or bismaleimides, etc.

Among the objects of this invention are vulcanizable compositions of olefin polymers or copolymers, in which radical initiators, as well as free-radical acceptors are present, which make it possible to effectively increase the cross-linking degree of the polymers or copolymers in question.

Another object of this invention is to decrease the offensive odor of the vulcanized products obtained with conventional recipes, and more particularly with sulfur.

It has been found that an effective vulcanization is obtained by adding an organic peroxide as a radicalic initiator and a furan derivative as a free-radical acceptor to the mixes of the said polymers or copolymers. Heating of these mixes to the vulcanization temperature results in obtaining improved polymers and copolymers. The vulcanizable compositions according to this invention, therefore, consist of the olefin polymer or copolymer, an organic peroxide, an organic furan derivative compound acting as a free-radical acceptor; and if desired, reinforcing fillers.

Said furanic compound is preferably selected from the group consisting of furfural, furfuryl alcohol, furoic acid, furfuramide, furil, the condensation product of furfural and a hydrazine and compounds having the formula:

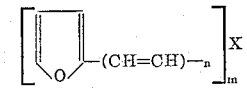

wherein X is an organic radical containing an electronegative group such as e.g. —CHO, —COOH, —CONH$_2$, —CN, —NO$_2$, —COOR, —CO—, —COOCO—, —CH$_2$COCH$_2$COOR, —CH(COOR)$_2$, $n$ is 1 or 2, $m$ is the number of free valences of X, and R is an alkyl or aryl radical.

One preferred feature of this invention includes compositions which comprise, as a radical acceptor, a furan derivative containing an azinic group

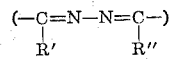

wherein R' and R" are selected from the group consisting of hydrogen, alkyl or cycloalkyl radicals. Among the compounds of this class, the azine of furfuraldehyde (or furfuraldazine, namely the condensation product of furfural and hydrazine) has been found to be particularly advantageous.

Another preferred feature includes compositions in which the radical acceptor is a furan compound characterized by the presence in the molecule of unsaturated bonds, at least in part conjugated with the furan nucleous. Examples of these compounds are: β-(alpha-furyl)-acrolein (I), 5(alpha-furyl)-pentadienal (II), (alpha-furyl)acrylamide, (alpha-furyl)acrylonitrile, β(alpha-furyl) acrylic acid and esters thereof, bis-furfurylidenacetone (III), 1-alpha-furyl)5-oxo-diene-1,3,1,9-bis(alpha-furyl)5-oxo-nona-tetraene-1,3,6,8 (IV), alpha-ethyl- β(alpha-furyl) acrolein, the esters of furfurylidenmalonic acid, furfuryliden-acetone (V)

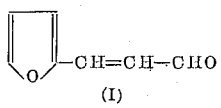
(I)

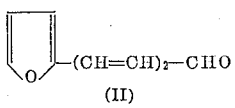
(II)

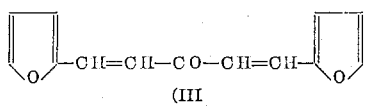
(III)

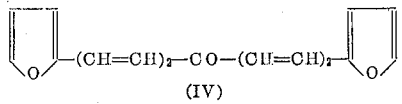
(IV)

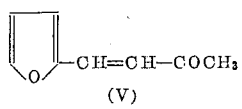
(V)

Good results are also obtained with the condensation products of β(alpha-furyl)acrolein with cyclic ketones, e.g., cyclopentanone and with cyclohexanone (see Ber. 76, 676 (1943)).

The organic peroxides used in the compositions of this invention include compounds such as cumyl peroxide, benzoyl peroxide, tert. butyl perbenzoate, tert. butyl cumyl peroxide, diperoxides and the like.

The amount of organic peroxide to be used depends on the desired degree of vulcanization and on the decomposition rate or reactivity of the peroxide used; amounts of 0.1–20% by weight with respect to the olefin polymer or copolymer, preferably of 0.5–10%, are desirable.

An amount of a radical-acceptor furan derivative sufficient to determine a real improvement in the characteristics of the vulcanized product must be used; this amount is comprised between 0.1 and 10%, and preferably between 0.5 and 5% by weight calculated on the polymer.

The olefin polymers and copolymers which can be cross-linked by the process of this invention are the solid polymers of alpha-olefins such as polyethylene, polypropylene, polybutene, and amorphous copolymers of ethylene with alpha-olefins, more particularly amorphous elastomeric copolymers of ethylene with propylene or of ethylene with butene. Said polymers or copolymers, are e.g. those obtained with catalytic systems based on a transition metal compound of Group 4b, 5b, 6b or 8 of the Periodic Table according to Mendeleef and of a metallorganic compound of an element of Group 1a, 2a or 3a of the same Periodic Table.

The copolymers of ethylene have a molecular weight higher than 60,000, preferably from 80,000 to 800,000, and an ethylene content of 30 to 70% by mols.

The polymers and copolymers obtained in solution by contact with a heterogeneous catalyst prevailingly consisting of aluminium oxide, chromium oxide and molybdenum oxide can also be used.

The temperature to be used for the vulcanization according to this invention vary depending on the decomposition temperature of the organic peroxide and, correspondingly, vary the heating times which are shorter at higher temperatures. Temperatures between 130° C. and 230° C., preferably between 140° and 180° C. are used generally, with heating times from 1 to 90 minutes.

By vulcanizing olefin polymers and copolymers with the process of this invention, better products are obtained characterized by polymers of a higher melting point and insolubility in hydrocarbon solvents and, of copolymers of improved mechanical and elastomeric characteristics, and more particularly by an improved modulus of elasticity and permanent set. The latter are in relationship to the degree of vulcanization.

Moreover, it should be stressed that the vulcanizates obtained from the compositions according to this invention do not present the offensive odor characterizing the vulcanizates obtained with the aid of other free-radical acceptors.

In the mixes according to this invention the usual fillers, pigments, stabilizers, etc., may be added.

The following examples illustrate the various features of the invention without limiting its scope.

Example 1

An ethylene-propylene copolymer (containing 55% by mols of propylene and having a Mooney viscosity (1+4) at 100° C. of 45) is combined with cumyl peroxide and furfural. The mix is prepared in a roll mixer at room temperature.

In Table I are reported the compositions of the mixes and the cross-linking values obtained with the peroxide alone, with the peroxide plus sulfur and with the peroxide plus furfural, respectively.

TABLE I

| Parts by weight: | | | |
|---|---|---|---|
| Ethylene-propylene copolymers | 100 | 100 | 100 |
| Cumyl peroxide | 6.5 | 6.5 | 6.5 |
| Furfural | | | 0.92 |
| Sulfur | | 0.3 | |
| Tensile strength, kg./cm.² | 15 | 14 | 14 |
| Elongation at break, percent | 465–475 | 340–370 | 320–370 |
| Modulus at 300% elongation, kg./cm.² | 9 | 12 | 12 |
| Residual elongation (100%) | 18 | 9 | 5 |
| Tear strength, kg./cm.² | 6 | 7 | 7 |
| Swelling degree at the equilibrium in CCl₄ at 30° C. (x) | 8.15–8.17 | 6.35–6.38 | 6.31–6.4 |
| Solubility in CCl₄ | 11.8–11.1 | 7.8–8.1 | 9.8 |

Vulcanization temperature, 165° C.
Vulcanization time, 30 minutes.

(x) the swelling degree is given by the formula $$g = 1 + \frac{(P_r - d_f)}{P_f \cdot d_s}$$

in which $g$ = swelling dgree
$P_r$ = weight of the swollen specimen (2 mm. · 5 mm. φ)
$P_f$ = weight the specimen swollen and dried
$d_f$ = density of the specimen swollen and dried
$d_r$ = density of the swelling liquid.

Example 2

An ethylene-propylene copolymer is charged with furnace carbon black and is then vulcanized with the ingredients of Example 1.

In Table II are reported the compositions of the mixes and the cross-linking values obtained with the peroxide alone, with the peroxide plus sulfur and with the peroxide plus furfural.

TABLE II

| Parts by weight: | | | |
|---|---|---|---|
| Ethylene propylene copolymer | 100 | 100 | 100 |
| Carbonblack HAF | 50 | 50 | 50 |
| Cumyl peroxide | 2.6 | 2.6 | 2.6 |
| Furfural | | | 0.93 |
| Sulphur | | 0.3 | |
| Tensile strength kg./cm.² | 118±5 | 192±11 | 170±6 |
| Elongation at break, percent | 440–460 | 350–380 | 400–410 |
| Modulus at 300% elongation, kg./cm.² | 61±2 | 140±4 | 109±3 |
| Residual elongation (200%) | 20 | 7 | 11.5 |
| Tear strength, kg./cm. | 44 | 42±1 | 44±4 |

Example 3

An ethylene-propylene copolymer is combined with cumyl peroxide and furfuramide (obtained by condensation between 3 mols of furfural and 2 mols of $NH_3$).

The mix is prepared in a roll mixer at room temperature.

In Table III are reported the compositions of the mixes and the mechanical characteristics of the vulcanizate in comparison with a similar mix, containing sulfur instead of furfuramide.

TABLE III

| Parts by weight: | | |
|---|---|---|
| Ethylene-propylene copolymer | 100 | 100 |
| Cumyl peroxide | 2.6 | 2.6 |
| Furfuramide | 0.43 | |
| Sulfur | | 0.3 |
| Tensile strength, kg./cm.$^2$ | 12 | 14 |
| Elongation at break, percent | 295–330 | 340–370 |
| Modulus at 300% elongation, kg./cm.$^2$ | 12 | 12 |
| Residual elongation (100%), percent | 6 | 9 |
| Tear strength (kg./cm.) | 8 | 7 |
| Swelling degree in $CCl_4$, percent | 6.26–6.28 | 6.35–6.38 |
| Solubility in $CCl_4$, percent | 9.35–9.5 | 7.8–8.1 |

Vulcanization temperature, 165° C.
Vulcanization time, 30 minutes.

Example 4

An ethylene-propylene copolymer is charged with furnace carbon black and is then vulcanized with the ingredients of Example 3.

In Table IV are reported the composition of the mix and the mechanical characteristics of the vulcanizate in comparison with a similar mix containing sulfur instead of furfuramide.

TABLE IV

| Parts by weight: | | |
|---|---|---|
| Ethylene-propylene copolymer | 100 | 100 |
| Carbon black HAF | 50 | 50 |
| Cumyl peroxide | 2.6 | 2.6 |
| Furfuramide | 0.43 | |
| Sulfur | | 0.3 |
| Tensile strength, kg./cm.$^2$ | 158±9 | 192±11 |
| Elongation at break, percent | 345–400 | 250–380 |
| Modulus at 300% elongation, kg./cm.$^2$ | 112±4 | 140±4 |
| Residual elongation (200%), percent | 11 | 7 |
| Tear strength, kg./cm. | .44±1 | 42±1 |

Vulcanization temperature, 165° C.
Vulcanization time, 30 minutes.

Example 5

An ethylene-propylene copolymer is combined with cumyl peroxide and furfuryl alcohol. The mix is prepared at room temperature in a roll mixer.

In Table V are reported the composition of the mix and the mechanical characteristics of vulcanizate in comparison with a similar mix containing sulfur instead of furfuryl alcohol.

TABLE V

| Parts by weight: | | |
|---|---|---|
| Ethylene-propylene copolymer | 100 | 100 |
| Cumyl peroxide | 2.6 | 2.6 |
| Furfuryl alcohol | 0.94 | |
| Sulfur | | 0.3 |
| Tensile strength kg./cm.$^2$ | 15.3 | 14 |
| Elongation at break, percent | 420–460 | 340–370 |
| Modulus at 300% elongation kg./cm.$^2$ | 10.4 | 12 |
| Residual elongation, percent | 6 | 9 |
| Tear strength | 15 | 7 |
| Swelling degree in $CCl_4$, percent | 7.55–7.40 | 6.35–6.38 |
| Solubility in $CCl_4$, percent | 10.8–10.5 | 7.8–8.1 |

Vulcanization temperature, 165° C.
Vulcanization time, 30 minutes.

Example 6

An ethylene-propylene copolymer is charged with furnace carbon black and is then vulcanized with the same ingredients of Example 5.

In Table VI are reported the composition of the mix and the mechanical characteristics of vulcanizate in comparision with a similar mix containing sulfur instead of furfuryl alcohol.

TABLE VI

| Parts by weight: | | |
|---|---|---|
| Ethylene-propylene copolymer | 100 | 100 |
| Carbon black HAF | 50 | 50 |
| Cumyl peroxide | 2.6 | 2.6 |
| Furfuryl alcohol | 0.94 | |
| Sulfur | | 0.3 |
| Tensile strength, kg./cm.$^2$ | 126±1 | 192±11 |
| Elongation at break, percent | 440–470 | 250–380 |
| Modulus at 300% elongation, kg./cm.$^2$ | 65±2 | 140±4 |
| Residual elongation (200%), percent | 14 | 7 |
| Tear strength, kg./cm. | 43±2 | 42±1 |

Vulcanization temperature, 165° C.
Vulcanization time, 30 minutes.

Example 7

An ethylene-propylene copolymer is combined with cumyl peroxide and furil. The mix is prepared in a roll mixer at room temperature.

In the Table VII are reported the composition of the mix and the vulcanizate characteristics in comparison with a similar mix containing sulfur instead of furil.

TABLE VII

| Parts by weight: | | |
|---|---|---|
| Ethylene-propylene copolymer | 100 | 100 |
| Cumyl peroxide | 2.6 | 2.6 |
| Furil | | 0.91 |
| Sulfur | 0.3 | |
| Tensile strength, kg./cm.$^2$ | 14 | 12 |
| Elongation at break, percent | 340–370 | 310–350 |
| Modulus at 300% elongation, kg./cm$^2$ | 12 | 10 |
| Residual elongation (100%) | 9 | 6 |
| Tear strength, kg./cm.$^2$ | 7 | 8 |
| Swelling degree in $CCl_4$ | 6.36 | 6.34 |
| Solubility in $CCl_4$, percent | 7.95 | 12 |

Vulcanization temperature, 165° C.
Vulcanization time, 30 minutes.

Example 8

An ethylene-propylene copolymer is charger with furnace carbon black and is then vulcanized with the ingredients of Example 7.

In Table VIII are reported the composition of the mix and the mechanical characteristics of the vulcanizate in comparison with a similar mix containing sulfur instead of furil.

TABLE VIII

| Parts by weight: | | |
|---|---|---|
| Ethylene-propylene copolymer | 100 | 100 |
| Carbon black HAF | 50 | 50 |
| Cumyl peroxide | 2.6 | 2.6 |
| Furil | | 0.91 |
| Sulfur | 0.3 | |
| Tensile strength, kg./cm.$^2$ | 192±11 | 170±6 |
| Elongation at break, percent | 350–380 | 485–490 |
| Modulus at 300% elongation, kg./cm.$^2$ | 140±4 | 83±5 |
| Residual elongation (100%) | 7 | 13 |
| Tear strength, kg./cm. | 42±1 | 63±3 |

Vulcanization temperature 165° C.
Vulcanization time 30 minutes.

Example 9

In the following example are reported the results obtained with other radical acceptor agents, already known in the literature, in comparison with the results obtained with furfural according to the teachings of the present invention.

TABLE IX

| Parts by weight: | | | | | | |
|---|---|---|---|---|---|---|
| Ethylene propylene copolymer | 100 | 100 | 100 | 100 | 100 | 100 |
| Cumyl peroxide | 2.6 | 2.6 | 2.6 | 2.6 | 2.6 | 2.6 |
| Furfural | 0.92 | | | | | |
| Dibenzo GMF (dibenzoyl-p-chinondioxime) | | 0.34 | | | | |
| GMF (p-quinondioxime) | | | 1.3 | | | |
| Benzoquinone | | | | 1.1 | | |
| NN'-p-phenylendimaleimide | | | | | 2.5 | |
| Activator OC (triallylcyanurate) | | | | | | 2.4 |
| Tensile strength, kg./cm.² | 14 | 12 | 11.3 | 16±2 | 5.8±1 | 18 |
| Elongation at break, percent | 320/370 | 150/185 | 400/430 | 470/600 | 80/145 | 455/465 |
| Modulus at 300% elongation kg./cm.² | 12 | | 8.8 | 8.5 | | 10 |
| Residual elongation (200%) | R | R | 22 | 14 | R | 17 |
| Residual elongation (100%) | 5 | 4 | | | R | |
| Tear strength, kg./cm.² | 7.1 | 7.8 | 8.5 | 7.7 | 7.3 | 8 |
| Swelling degree in CCl₄, percent | 6.31/6.42 | 4.98/5.09 | 7.42/7.41 | 7.52/7.35 | 6.88/6.81 | 11.8 |
| Stability in CCl₄, percent | 9.8 | 9.5/10.2 | 16/16.5 | 14.8/15.6 | 12.6/12.3 | 7.63 |

Vulcanization temperature, 165° C.
Vulcanization time, 30 minutes.
R indicates break.

*Example 10*

In Table X are reported the mechanical characteristics, the swelling degree and the solubility in CCl₄, at the 30° C. equilibrium, of vulcanized products obtained by curing an ethylene-propylene copolymer having a Mooney plasticity (ML 1+4 at 100° C.) of 45 with cumyl peroxide and various amounts of furfural. In run 1 is reported a comparison of the result obtained by using the optimum amount of sulfur as a coadjuvant. In Table XI are reported the mechanical characteristics of vulcanizates containing various amounts of furfural, reinforced with 50 parts by weight of carbon black of the high abrasion furnace type. Also reported is a comparison test with sulfur as a coadjuvant.

A vulcanized specimen having the following characteristics is obtained:

Tensile strength (kg./cm.²) _____ 181
Elongation at break (percent) _____ 400
Modulus at 300% (kg./cm.²) _____ 125
Permanent set (200%) percent _____ 10

The odor of various vulcanized sheets above obtained, have an odor intensity decidedly lower than and of an extremely more pleasant type than the respective intensity and odor type of sheets obtained from mixes similar to the above in which sulfur had been substituted for the azine.

TABLE X

| Parts by weight: | | | | | | |
|---|---|---|---|---|---|---|
| Ethylene propylene copolymer | 100 | 100 | 100 | 100 | 100 | .06 |
| Cumyl peroxide | 2.6 | 2.6 | 2.6 | 2.6 | 2.6 | 102 |
| Sulfur | 0.3 | | | | | |
| Furfural | | 0.46 | 0.92 | 1.38 | 1.84 | 2.76 |
| Tensile strength, kg./cm.² | 13.1 | 13.1 | 12.3 | 13±1 | 14±1 | 12.7 |
| Elongation at break, percent | 340/370 | 330/390 | 220/290 | 280/300 | 265/310 | 245/310 |
| Modulus at 100% elongation, kg./cm.² | | | 7 | 6.6 | 6.8 | 6.8 |
| Modulus at 300% elongation, kg./cm.² | 11.6 | 10.7 | | 14 | 15 | 13.7 |
| Permanent set (100%) | 6.5 | 8 | 6 | 6 | 6 | Break |
| Swelling degree in CCl₄ | 6.45/6.44 | 7.10/7.24 | 6.12/6.18 | 5.86/5.62 | 5.95/5.88 | 5.80/5.85 |
| Solubility in CCl₄ | 10.9/10.6 | 9.22/9.32 | 9.84/9.60 | 9.32/8.95 | 8.25/8.47 | 9.10/9.00 |

Vulcanization temperature, 165° C.
Vulcanization time, 30 minutes.

TABLE XI

| Parts by weight: | | | | | |
|---|---|---|---|---|---|
| Ethylene propylene copolymer | 100 | 100 | 100 | 100 | 100 |
| Carbon black HAF | 50 | 50 | 50 | 50 | 50 |
| Cumyl peroxide | 2.6 | 2.6 | 2.6 | 2.6 | 2.6 |
| Sulfur | 0.3 | | | | |
| Furfural | | 0.46 | 0.92 | 1.38 | 1.84 |
| Tensile strength, kg./cm.² | 192±11 | 181±10 | 170±6 | 153±4 | 183±7 |
| Elongation at break, percent | 350/380 | 390/450 | 400/410 | 385/420 | 470/500 |
| Modulus at 300% elongation, kg./cm.² | 140±4 | 89±2 | 109±3 | 90±5 | 78±2 |
| Permanent set (200%) | 7 | 11 | 11.5 | 10.5 | 11 |
| Tear strength, kg./cm. | 42±1 | 37 | 44±4 | 35±1 | 46 |

Vulcanization temperature, 165° C.
Vulcanization time, 30 minutes.

*Example 11*

100 parts of an ethylene-propylene copolymer (50:50 by mols Mooney ML (1+4) at 100° C.=35) are mixed in roll mixer with 50 parts of HAF carbon black, 6.75 parts of 40% dicumyl peroxide and 0.6 part of furfuraldazine.

The mixture is vulcanized at 165° C. for 40 minutes

*Examples 12–15*

By operating as described in the preceding example, 100 parts of an ethylene-propylene copolymer (containing 50–50% by mols and having a Mooney viscosity ML (1+4) at 100° C.=35) are mixed with 50 parts of HAF carbon black, 4.5 parts of 40% alpha-alpha'(bis-tert.butyl-peroxy)-diisopropyl benzene and variable amounts of furfuraldazine.

The properties of the obtained vulcanizates, as a function of the azine content are reported in the following table:

| Examples | 12 | 13 | 14 | 15 |
|---|---|---|---|---|
| Parts of azine of furfural | 0.3 | 0.45 | 0.6 | 0.75 |
| Tensile strength (kg./cm.$^2$) | 175 | 174 | 194 | 183 |
| Elongation at break (percent) | 400 | 360 | 400 | 400 |
| Modulus at 300% (kg./cm.$^2$) | 112 | 132 | 130 | 124 |
| Permanent set (200%), percent | 12 | 9 | 10 | 12.5 |

All the above vulcanizaties have a low and inoffensive odor, of an acceptable intensity and type, by comparison with odors of the vulcanizates obtainable from the same mixes wherein sulfur is substituted for furfuraldazine.

Examples 16–20

100 parts of an ethylene-propylene copolymer (50:50 by mols) are mixed in a roll mixer with 50 parts of HAF carbon black, 4.5 parts of 40% alpha,alpha'-bis-furfurylidenacetone.

The properties of the obtained vulcanizates are reported, in Table XII, as the function of the different proportion of coagent (vulcanization conditions: 165° C., 40 minutes).

TABLE XII

| Examples | 16 | 17 | 18 | 19 | 20 |
|---|---|---|---|---|---|
| Parts of sulfur | | | | | 0.32 |
| Parts of bis-furfurylidenacetone | 0.3 | 0.45 | 0.6 | 0.75 | |
| Tensile strength (kg./cm.$^2$) | 175 | 171 | 173 | 175 | 200 |
| Elongation at break (percent) | 400 | 340 | 320 | 320 | 400 |
| Modulus at 300% | 120 | 149 | 154 | 158 | 133 |
| Modulus at 200% | 54 | 66 | 75 | 73 | |

Examples 21–22

By operating under the same conditions of Examples 16–20, variable amounts of β-(alpha-furyl)acrolein are added to the same vulcanization mix instead of bis-furfurylidenacetone.

After vulcanization (160° C., 40 minutes) the following data are measured:

| Examples | 21 | 22 |
|---|---|---|
| Parts of β(alpha-furyl)acrolein | 0.45 | 0.6 |
| Tensile strength (kg./cm.$^2$) | 165 | 178 |
| Elongation at break (percent) | 360 | 400 |
| Modulus at 300% | 128 | 116 |
| Modulus at 200% | 58 | 47 |

Examples 23–26

By operating as described in Examples 16–20, 100 parts of ethylene-propylene copolymer are mixed with 50 parts of HAF carbon black 4.6 parts of alpha-alpha'-bis(tert-butyl peroxy) diisopropylbenzene and variable amounts of 1,9-bis (alpha-furyl) 5-oxononaterauene (1,3,6,8) (IV), instead of bis-furfurylidenacetone.

The vulcanization (160° C., 40 minutes) results are reported in Table XIII.

TABLE XIII

| Examples | 23 | 24 | 25 | 26 |
|---|---|---|---|---|
| Parts of (IV) | 0.3 | 0.6 | 0.75 | 0.9 |
| Tensile strength (kg./cm.$^2$) | 159 | 175 | 180 | 180 |
| Elongation at break (percent) | 380 | 340 | 320 | 340 |
| Modulus at 300% | 120 | 146 | 156 | 146 |
| Modulus at 200% | 60 | 74 | 76 | 73 |

Examples 27–28

By using the same mix and operating the same conditions of Examples 16–20, furfurylidenacetone (VP 22) is used as the coagent instead of bis-furfurylidenacetone.

| Examples | 27 | 28 |
|---|---|---|
| Parts of (VP 22) | 0.45 | 0.6 |
| Tensile strength (kg./cm.$^2$) | 175 | 190 |
| Elongation at break (percent) | 360 | 380 |
| Modulus at 300% | 142 | 139 |
| Modulus at 200% | 70 | 66 |

Example 29

By using the same mix and operating under the same conditions of Examples 16–20, 1(alpha-furyl)5-oxo-diene-5-oxo-diene-1,3 (VP 21) is used as the coagent instead of bis-furfurylidenacetone.

The results obtained in the vulcanization are exemplified by the following data:

Parts of (VP 21) _____ 0.75
Tensile strength (kg./cm$^2$) _____ 182
Elongation at break (%) _____ 360
Modulus at 300% _____ 143
Modulus at 200% _____ 67

Example 30

By using the same mix and operating under the same conditions of Examples 16–20, the condensation product of β(alphafuryl)-acrolein and cyclopentanone (VP 18) is used as the coagent of the peroxide instead of bis-furfurylidenacetone.

| Parts of (VP 18) | 0.3 | 0.75 |
|---|---|---|
| Tensile strength (kg./cm.$^2$) | 167 | 189 |
| Elongation at break, percent | 360 | 340 |
| Modulus at 300% | 129 | 150 |
| Modulus at 200% | 65 | 78 |

Example 31

By using the same mix and operating under the same conditions of Examples 16–20, the condensation product of β(αfuryl) acrolein and cyclohexanone (VP 19) is used as the co-agent of the peroxide instead of bis-furfurylidenacetone.

| | | |
|---|---|---|
| Parts of (VP 19) | 0.3 | 0.45 |
| Tensile strength (kg./cm.²) | 164 | 170 |
| Elongation at break (percent) | 340 | 320 |
| Modulus at 300% | 131 | 147 |
| Modulus at 200% | 66 | 69 |

What is claimed is:

1. Vulcanizable compositions selected from the group consisting of solid alpha-olefin polymers, and amorphous elastomeric copolymers of ethylene and alpha-olefins, together with an organic peroxide radical initiator and an organic furan derivative acting as a free-radical acceptor.

2. The compositions of claim 1 wherein the furan derivative is selected from the group consisting of furfural, furfuryl alcohol, furoic acid, furfuramide, furil; compounds having the formula:

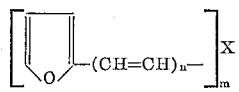

wherein X is a radical selected from the group consisting of —CHO, —COOH, —CONH₂, —CN, —NO₂, —COOCO—, —COOR, —CO—, —CH₂COCH₂COOR and CH(COOR)₂, wherein R is selected from the group consisting of alkyl and aryl, wherein n is an integer between 1 and 2 and wherein m is the number of free valences of X; compounds which are furan derivatives containing the azine group;

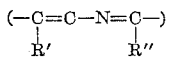

wherein R′ and R″ are selected from the group consisting of hydrogen, alkyl and cycloalkyl; and mixtures thereof.

3. The compositions of claim 1 wherein the furan derivative is furfural.

4. The compositions of claim 1 wherein the furan derivative is furfuramide.

5. The compositions of claim 1 wherein the furan derivative is furfuryl alcohol.

6. The compositions of claim 1 wherein the furan derivative is furoic acid.

7. The compositions of claim 1 wherein the furan derivative is furil.

8. The compositions of claim 1 wherein the furan derivative is furfuraldazine.

9. The compositions of claim 1 wherein the furan derivative is bis-furfurylidenacetone.

10. The compositions of claim 1 wherein the furan derivative is β(alpha-furyl)acrolein.

11. The compositions of claim 1 wherein the furan derivative is 1,9-bis (alpha-furyl)5-oxononatetraene-1,3,6,8.

12. The compositions of claim 1 wherein the furan derivative is furfurylidenacetone.

13. The compositions of claim 1 wherein the furan derivative is 1(alpha-furyl)5-oxo-diene-1,3.

14. The compositions of claim 1 wherein the furan derivative is the condensation product of β(alpha-furyl)-acrolein and cyclopentanone.

15. The compositions of claim 1 wherein the furan derivative is the condensation product of β(alpha-furyl)-acrolein and cyclohexanone.

16. The compositions of claim 1 containing a reinforcing filler.

17. The compositions of claim 1 characterized in that the organic furan derivative acting as a free radical acceptor comprises from about 0.1 to about 10% by weight of the group consisting of solid alpha-olefin polymers, and amorphous elastomeric copolymers of ethylene and alpha-olefins.

18. The compositions of claim 1 characterized in that the organic furan derivative acting as a free radical acceptor comprises from about 0.5 to about 5% by weight of the group consisting of solid alpha-olefin polymers, and amorphous elastomeric copolymers of ethylene and alpha-olefins.

19. The compositions of claim 1 characterized in that the organic peroxide comprises from about 0.1 to about 20% by weight of the group consisting of solid alpha-olefin polymers, and amorphous elastomeric copolymers of ethylene and alpha-olefins.

20. The compositions of claim 1 wherein the copolymer is an ethylene-propylene copolymer.

21. The compositions of claim 20 wherein the copolymer has a molecular weight between about 80,000 and about 800,000.

22. The compositions of claim 20 wherein the copolymer has an ethylene molar content between about 20 and about 70%.

23. The process for vulcanizing the composition of claim 1 which comprises heating the composition at between about 130° C. and about 230° C. for from about 1 to about 90 minutes.

24. The process for vulcanizing the composition of claim 16 which comprises heating the composition at between about 130° C. and about 230° C. for from about 1 to about 90 minutes.

No references cited.

JOSEPH L. SCHOFER, *Primary Examiner.*

L. EDELMAN, *Assistant Examiner.*